US009399488B2

(12) United States Patent
Imanishi

(10) Patent No.: US 9,399,488 B2
(45) Date of Patent: Jul. 26, 2016

(54) VEHICLE SUBFRAME

(71) Applicant: HONDA MOTOR CO., LTD., Minato-Ku, Tokyo (JP)

(72) Inventor: Tomoyuki Imanishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/786,200

(22) PCT Filed: Apr. 25, 2014

(86) PCT No.: PCT/JP2014/061673
§ 371 (c)(1),
(2) Date: Oct. 22, 2015

(87) PCT Pub. No.: WO2014/175416
PCT Pub. Date: Oct. 30, 2014

(65) Prior Publication Data
US 2016/0068189 A1    Mar. 10, 2016

(30) Foreign Application Priority Data

Apr. 26, 2013   (JP) .................................. 2013-094022

(51) Int. Cl.
| | | |
|---|---|---|
| *B62D 21/11* | (2006.01) | |
| *B22C 9/24* | (2006.01) | |
| *B22C 9/10* | (2006.01) | |
| *B62D 29/00* | (2006.01) | |

(52) U.S. Cl.
CPC . *B62D 21/11* (2013.01); *B22C 9/10* (2013.01); *B22C 9/24* (2013.01); *B62D 29/008* (2013.01)

(58) Field of Classification Search
CPC ........ B62D 21/11; B62D 29/008; B22C 9/10; B22C 9/24
See application file for complete search history.

(56) References Cited

U.S. PATENT DOCUMENTS

| 7,946,377 B2 | 5/2011 | Frasch et al. | |
|---|---|---|---|
| 2013/0009390 A1* | 1/2013 | Charest ................. | B22D 19/00 280/785 |
| 2013/0200653 A1* | 8/2013 | Yasui .................... | B62D 21/11 296/187.08 |
| 2013/0249250 A1* | 9/2013 | Ohhama ............... | B62D 21/11 296/204 |
| 2013/0334840 A1* | 12/2013 | Iseki ..................... | B62D 21/11 296/193.09 |
| 2014/0312655 A1* | 10/2014 | Takahashi ............ | B62D 21/10 296/204 |
| 2015/0152526 A1* | 6/2015 | Asami ................ | B22D 17/2218 420/532 |

(Continued)

FOREIGN PATENT DOCUMENTS

| JP | 2006-347348 A | 12/2006 |
|---|---|---|
| JP | 2012-091693 A | 5/2012 |

*Primary Examiner* — Drew Brown
(74) *Attorney, Agent, or Firm* — Carrier Blackman & Associates, P.C.; Joseph P. Carrier; William D. Blackman

(57) ABSTRACT

A vehicle subframe includes, at the bottom of a main body section, a lateral expansion section, a left vertical expansion section, a right vertical expansion section, and a concavity. The lateral expansion section joins a left front joining section and a right front joining section, and expands below the concavity. Of the left vertical expansion section, the front end is joined to the left end of the lateral expansion section, and the left vertical expansion section is inclined with a downward slope from the rear side of the main body section towards the front end. The right vertical expansion section is formed in a left-right symmetrical manner with respect to the left vertical expansion section, and the front end is joined to the lateral expansion section. The concavity is encircled by the vertical expansion sections and the lateral expansion section, and is formed in a concave shape facing upwards.

2 Claims, 11 Drawing Sheets

(56) References Cited

U.S. PATENT DOCUMENTS

| | | | | |
|---|---|---|---|---|
| 2015/0166104 A1* | 6/2015 | Ohhama | ............... | B62D 21/11 296/193.01 |
| 2016/0016611 A1* | 1/2016 | Shirooka | ............... | B62D 21/11 296/187.09 |
| 2016/0075379 A1* | 3/2016 | Imanishi | ............... | B62D 21/11 296/204 |
| 2016/0090125 A1* | 3/2016 | Imanishi | .................. | B22C 9/10 180/312 |

* cited by examiner

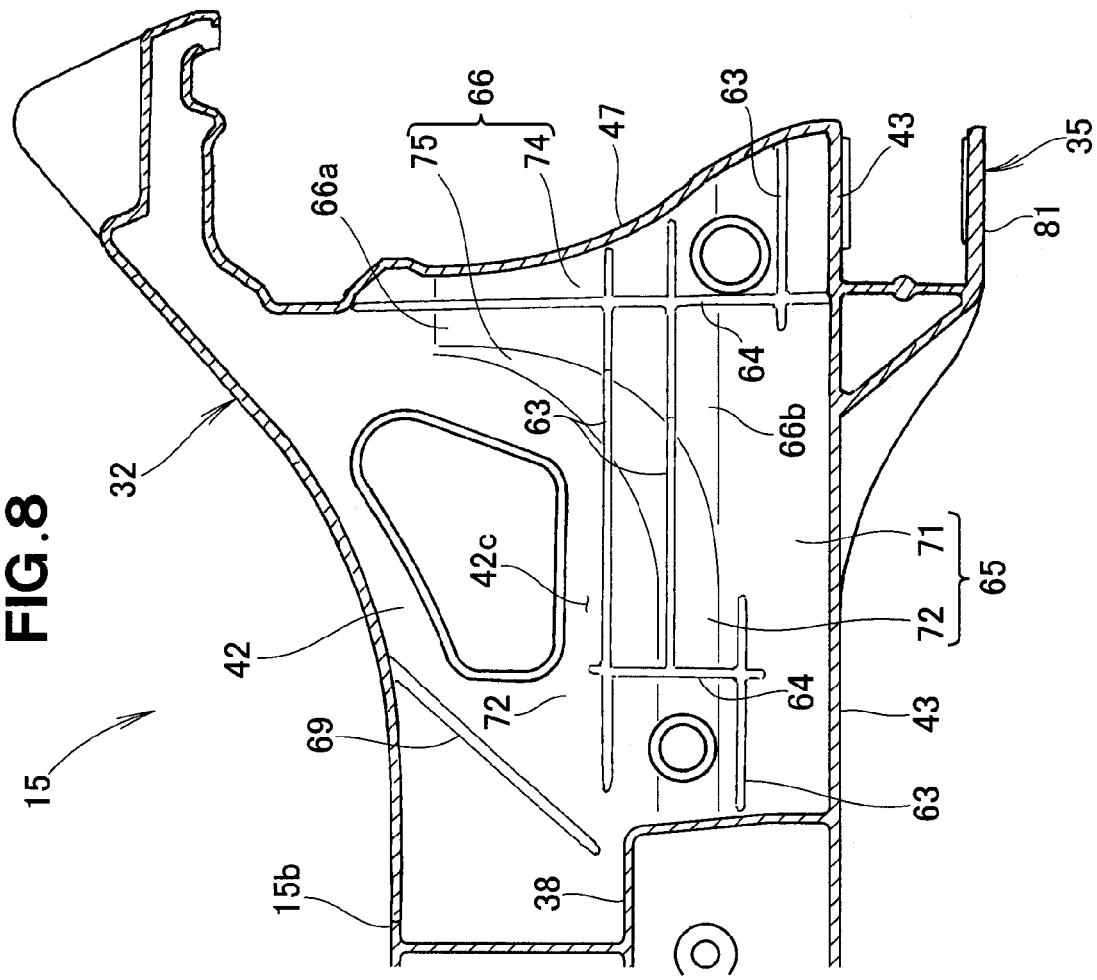
FIG.8
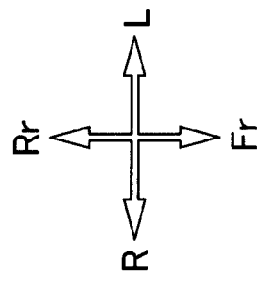

VEHICLE SUBFRAME

TECHNICAL FIELD

The present invention relates to vehicle subframes which are provided under a vehicle body and which support left and right suspensions by means of left and right suspension arms connected to left and right end portions thereof.

BACKGROUND ART

Examples of the conventionally-known vehicles include ones which include a cast (cast-molded) subframe provided on a vehicle body frame and which include suspension arms connected to left and right end portions of the subframe so that left and right suspensions are supported respectively by the left and right suspension arms.

A plurality of ribs is provided on the subframe so that a sufficient rigidity and strength of the subframe can be secured by the ribs (see, for example, Patent Literature 1).

With the subframe disclosed in Patent Literature 1, it is required to determine molded directions (orientations) of the plurality of ribs in such a manner as to secure a sufficient rigidity and strength of the subframe.

Further, in casting the subframe, it is required to smoothly direct molten metal into a cavity of a casting mold. As a means for directing the molten metal into the casting mold cavity, it is conceivable to conform or match the orientations of the plurality of ribs with the flowing direction of the ribs. However, it is difficult to determine the orientations of the plurality of ribs so as to secure a sufficient rigidity and strength of the subframe and match the molten metal flowing direction. For example, if the orientations of the plurality of ribs are determined so as to smooth the molten metal flows, it tends to be difficult to secure a sufficient rigidity and strength of the subframe by means of the plurality of ribs.

Thus, if the molten metal flows are to be smoothed by the plurality of ribs, it is necessary to increase a wall thickness of the subframe to thereby secure a sufficient rigidity and strength of the subframe, which cannot meet a demand for minimizing an increase of the weight of the subframe.

Prior Art Literature

Patent Literature 1: JP 2012-91693 A

SUMMARY OF INVENTION

Technical Problem

It is therefore an object to provide an improved vehicle subframe which can secure a sufficient rigidity and yet minimize an increase of weight.

Solution to Problem

According to the present invention, there is provided an improved vehicle subframe integrally formed by casting using a core, which comprises: a subframe body formed in a hollow shape by use of the core and including an upper section and a lower section spaced from each other in an up-down direction of the subframe by a predetermined distance; and left and right suspension support sections provided on left and right end portions, respectively, of the subframe body, the left and right suspension support sections respectively having left and right suspension arms connected thereto for supporting left and right suspensions, the left and right suspension support sections including left and right front connection sections, respectively, provided on front portions of an outer peripheral portion (i.e., front outer peripheral portions) of the subframe body, and left and right rear connection sections provided on a rear outer peripheral portion of the subframe body, the lower section of the subframe body including: a transverse protruding section interconnecting the left and right front connection sections and protruding downwardly; longitudinal protruding sections connected at respective front end portions thereof to the transverse protruding section, each of the longitudinal protruding sections slanting downward from a rear portion of the subframe body toward the front end portion; and a recessed section surrounded by the longitudinal protruding sections and the transverse protruding section, the recessed section being formed in an upwardly concave shape.

Preferably, in the vehicle subframe, each of the longitudinal protruding sections is widened outwardly in a left-right direction of the subframe body from a rear end portion thereof, located adjacent to the rear portion of the subframe body, toward the front end portion of the longitudinal protruding section.

Advantageous Effects of Invention

In the present invention, the transverse protruding section is provided on the lower section of the subframe body, and the left and right front connection sections are interconnected by the transverse protruding section. The left and right front connection sections are provided on the outer peripheral portion of the subframe body. The longitudinal protruding sections are connected at their respective front end portions connected to the transverse protruding section, and each of the longitudinal protruding sections slants downward from the rear portion of the subframe body toward the front end portion. In addition, the recessed section surrounded by the longitudinal protruding sections and the transverse protruding section is formed in an upwardly concave shape.

Because the rear portion of the subframe body and the front connection sections are connected by the longitudinal protruding sections and the transverse protruding sections, the region of the subframe body from the rear portion to the front connection sections can be formed in a gentle shape with no irregularities.

Thus, in casting the subframe, it is possible to increase not only flowability with which molten metal poured through the rear portion of the subframe body flows to the front connection sections (toward the front of the vehicle), but also flowability with which the molten metal flows along the transverse protruding section to left and right side portions of the subframe. In this way, the molten metal can be smoothly directed to the front connection sections, so that a sufficient rigidity and strength of the front connection sections (and hence the subframe) can be secured.

Further, the region of the subframe body from the rear portion of the subframe body to the front connection sections can be formed in a gentle shape, so that a sufficient rigidity and strength of the front connection sections (and hence the subframe) can be secured. Thus, there is no need to form the subframe into a large thickness in order to secure a sufficient rigidity and strength of the subframe, with the result that an undesired increase of the weight of the subframe can be minimized Further, because the suspensions are connected to the suspension support sections via the suspension arms, a relatively large load would be input to the suspension support sections. Thus, by securing a sufficient rigidity of the front connection sections (i.e., suspension support sections), the present invention can achieve an increased reliability of the subframe.

Furthermore, because the region of the subframe body from rear portion to the front connection sections is formed in a gentle shape so that the flowability of the molten metal can be increased, the present invention can eliminate a need for forming a plurality of ribs in conformity with a flowing direction of the molten metal. Thus, in the present invention, a plurality of ribs can be formed in such directions (orientations) as to secure a sufficient rigidity and strength of the subframe, with the result that the subframe can be reinforced with the plurality of ribs. Because the subframe is reinforced with the plurality of ribs like this, it is possible to even more appropriately secure a rigidity and strength of the subframe, and thus, the present invention can even more effectively minimize an undesired increase of the weight of the subframe due to the large thickness of the subframe.

In a preferred implementation of the present invention, each of the longitudinal protruding sections is widened outwardly in a left-right direction of the subframe body from a rear end portion thereof located adjacent to the rear portion of the subframe body toward the front end portion of the longitudinal protruding section. Thus, in casting of the subframe, the molten metal poured through the rear portion of the subframe body can be smoothly directed to outwardly in the left-right direction (i.e., to the left and right front connection sections), so that a sufficient rigidity and strength of the left and right front connection sections (and hence the subframe) can be secured even more appropriately.

Further, because each of the longitudinal protruding sections is widened outwardly in the left-right direction of the subframe body from the rear end portion toward the front end portion, the front end portion of the longitudinal protruding section can be formed in a relatively large shape such that the corresponding front connection section can be provided directly on the front end portion. With this arrangement, it is possible to eliminate a need for forming, on the front end portion of each of the longitudinal protruding sections, a particular part for providing thereon the connection section, so that the subframe can be significantly simplified in construction.

BRIEF DESCRIPTION OF DRAWINGS

FIG. 8 is a sectional view taken along line 8-8 of FIG. 3;

DESCRIPTION OF EMBODIMENTS

In the following description, the terms "front (FR)", "rear (Rr)", "left (L)", "right (R)", etc. are used to refer to directions as viewed from a human driver of a vehicle.

Figure 1:
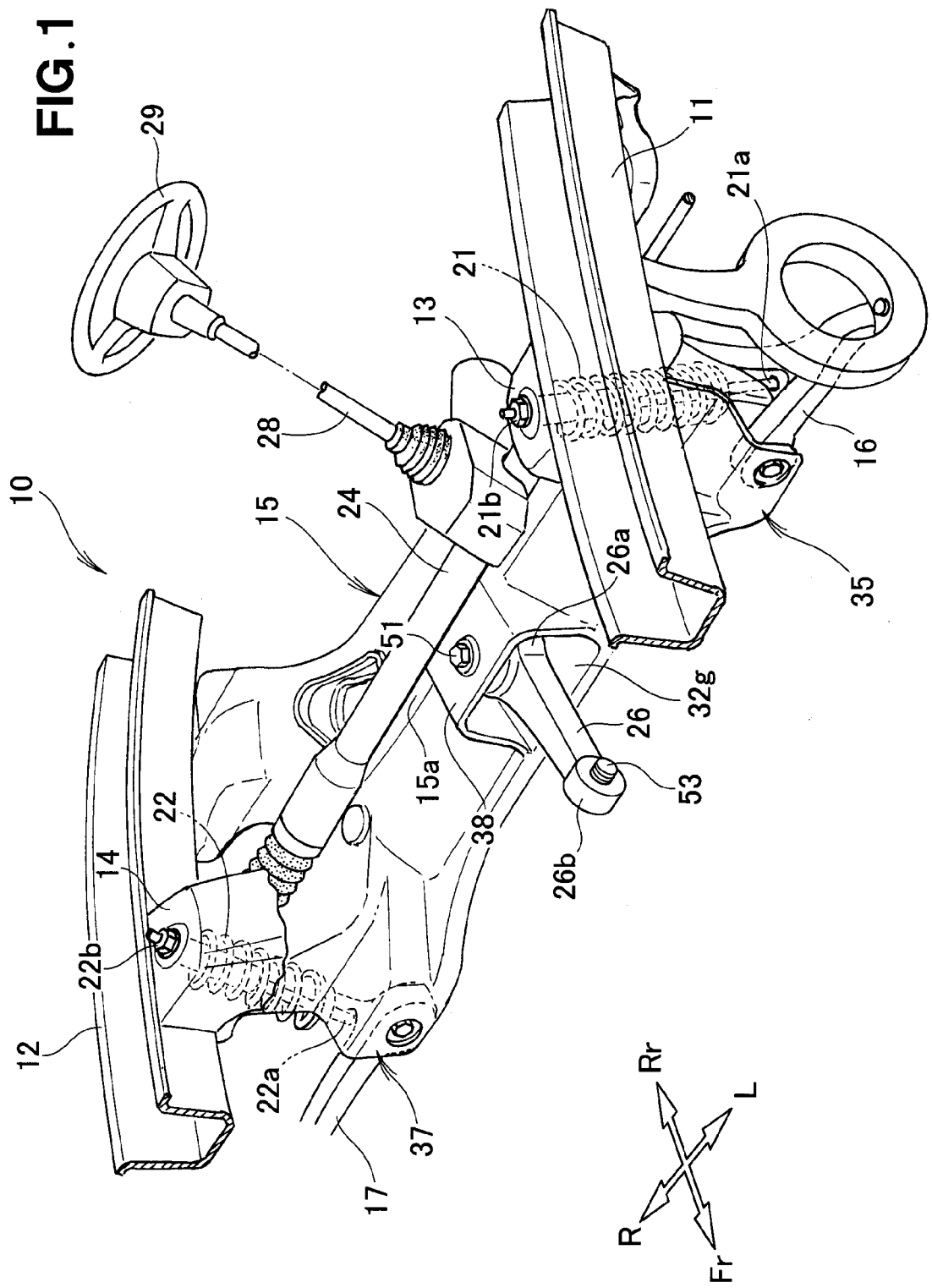
FIG. 1 is a perspective view illustrating a front vehicle body structure equipped with a vehicle subframe of the present invention.
Figure 2:
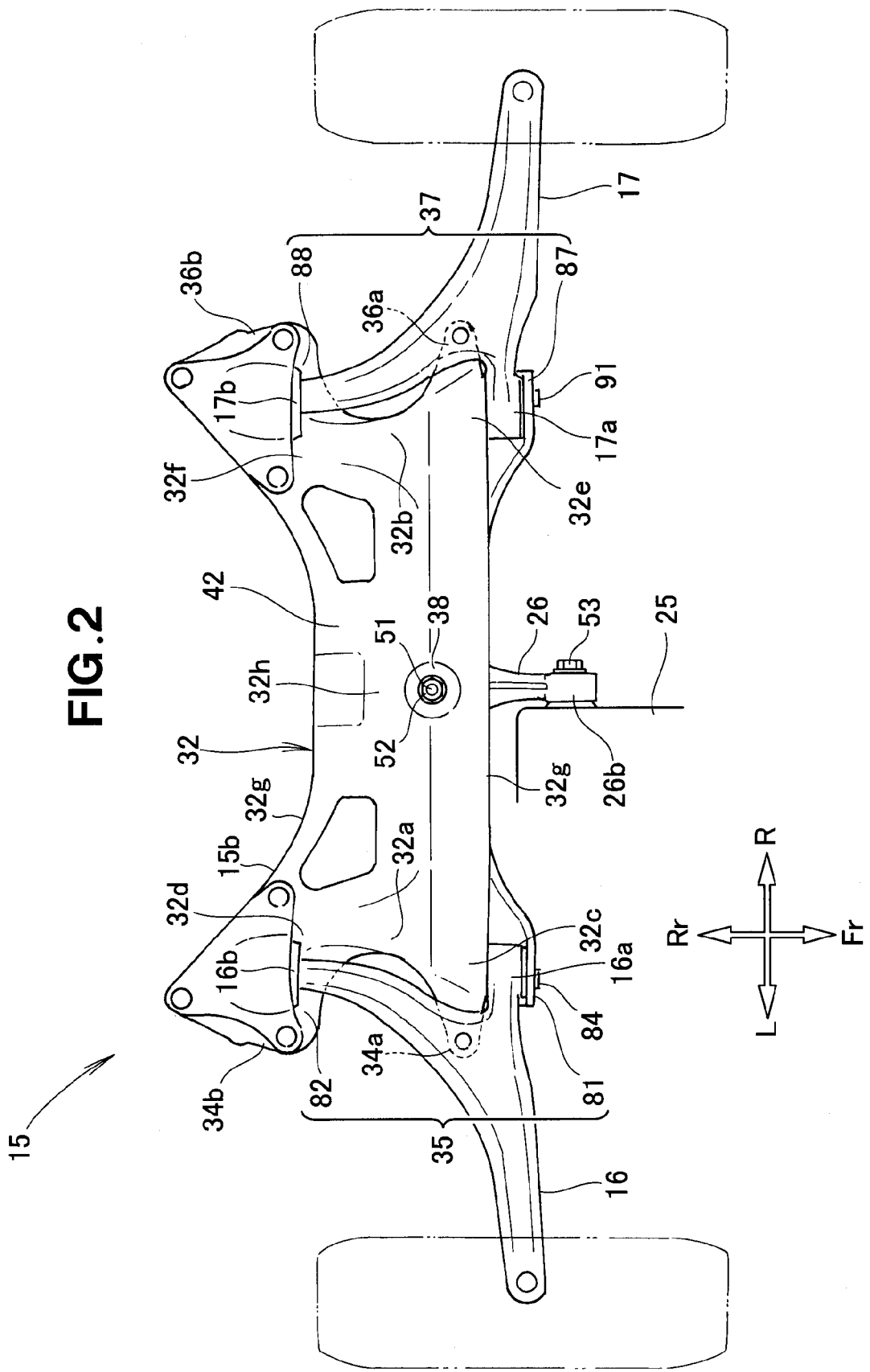
FIG. 2 is a bottom view of the subframe of the present invention with suspension arms provided thereon.

Described hereinbelow is an embodiment of a vehicle subframe 15 of the present invention. As shown in FIGS. 1 and 2, a front vehicle body structure 10 includes: left and right side frames 11 and 12 disposed to extend in a front-rear direction of the vehicle (vehicle front-rear direction); the subframe 15 mounted to the undersides of the left and right subframes 11 and 12; left and right suspension arms 16 and 17 provided on left and right end portions of the subframe 15; and left and right suspensions 21 and 22 connected to the left and right suspension arms 16 and 17.

The front vehicle body structure 10 further includes a steering gearbox 24 mounted on an upper portion 15a of the subframe 15, and a torque rod 26 interconnecting the subframe 15 and a power plant 25. A steering wheel 29 is mounted on a steering shaft 28 extending from the steering gearbox 24.

As an example, the power plant 25 is an engine/transmission unit where an engine and a transmission are formed integrally to function as a drive source of the vehicle. The power plant 25 is disposed in a transverse orientation between the left and right side frames 11 and 12.

Figure 3:
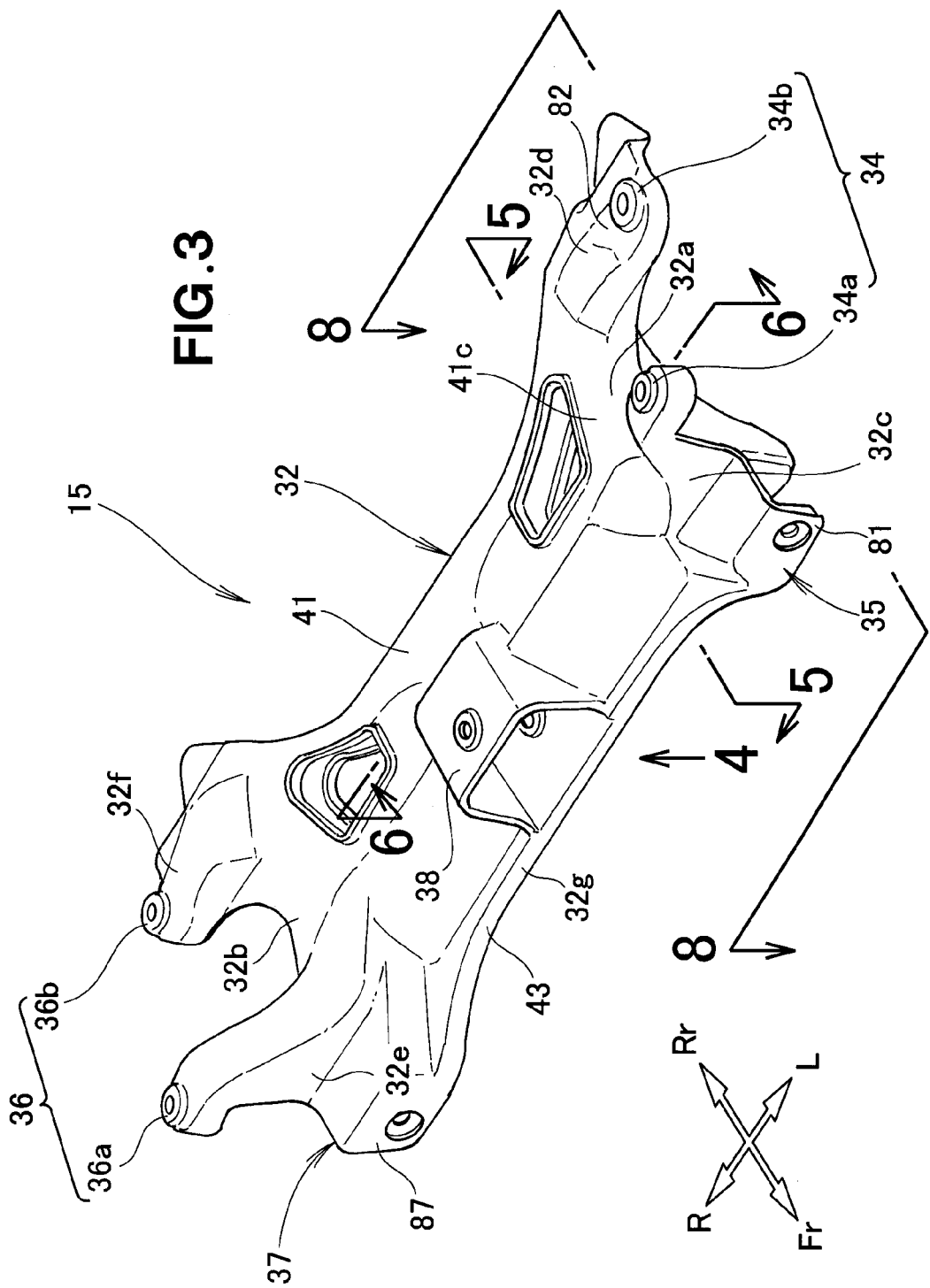
FIG. 3 is a perspective view showing the subframe of FIG. 1.
Figure 4:
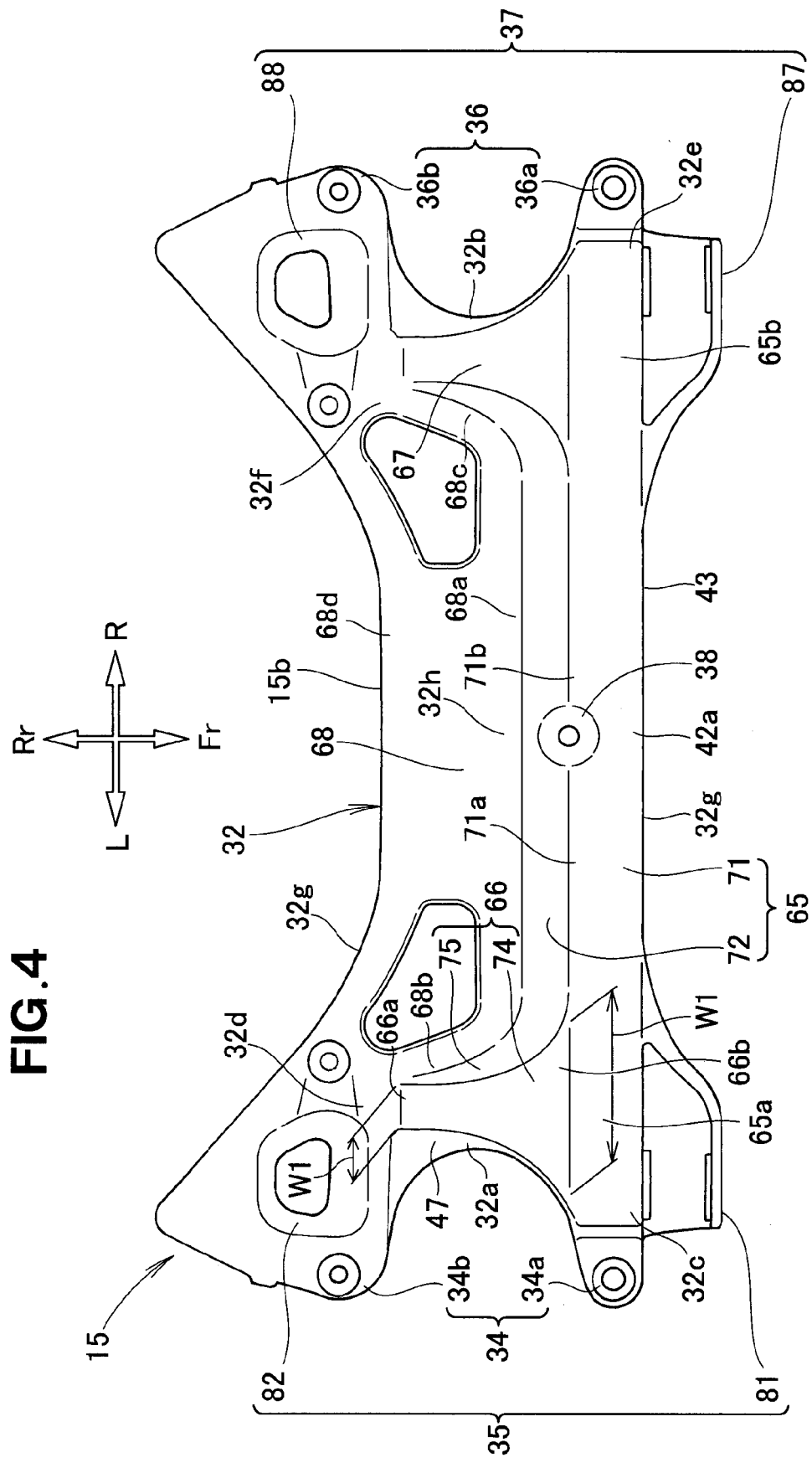
FIG. 4 is a view taken in the direction of arrow 4 of FIG. 3.
Figure 9:
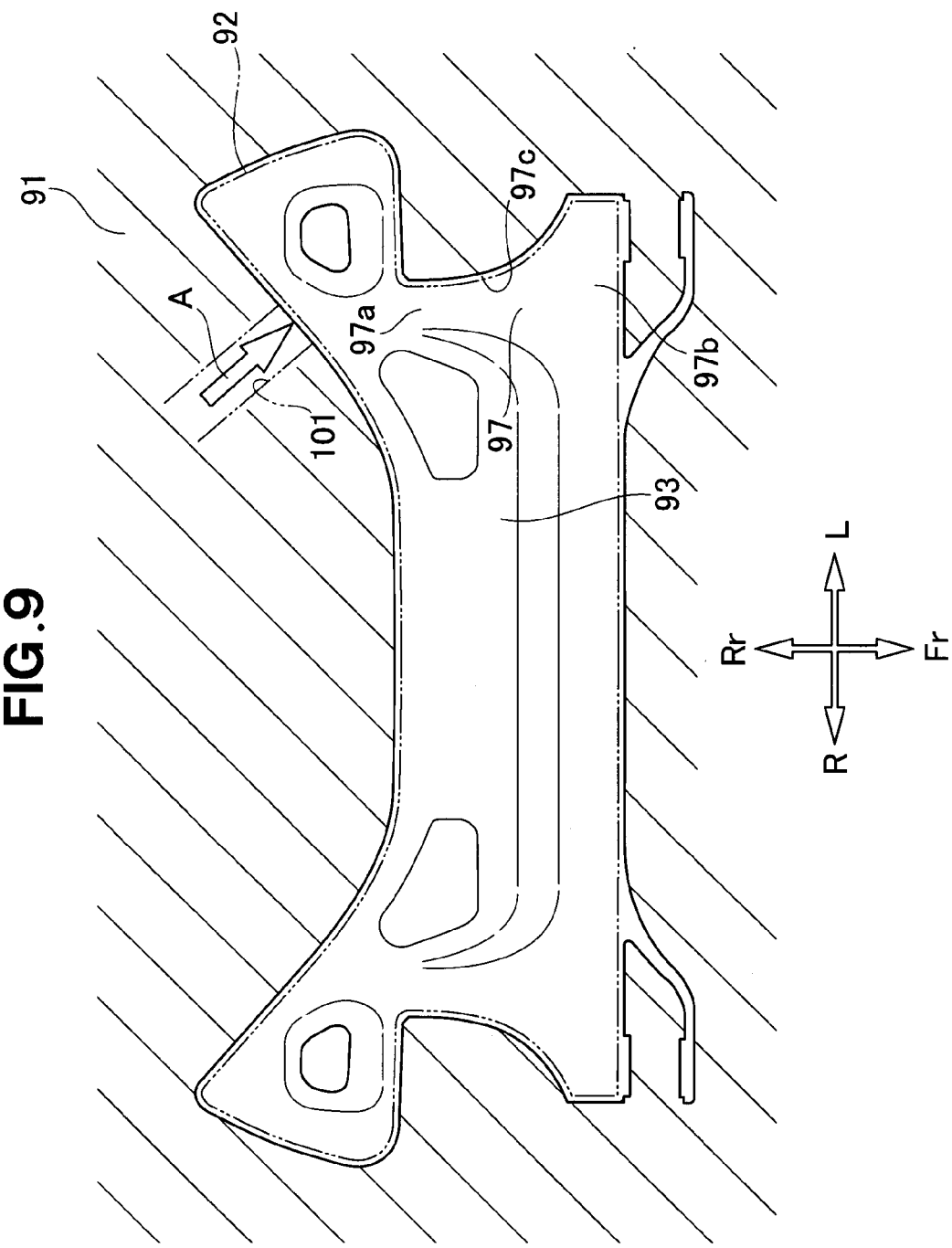
FIG. 9 is a view explanatory of an example manner in which molten metal is directed to a cavity in a casting process of the subframe of the present invention.

Further, as shown in FIGS. 3 and 4, the subframe 15 is integrally formed of aluminum alloy to a thickness T1 (see FIG. 5) by high-pressure casting using a core 92 (see FIG. 9). The subframe 15 includes: a subframe body 32 formed in a hollow shape by means of the core 92; a left vehicle body mounting section 34 and a left suspension support section 35 provided on a left end portion 32a of the subframe body 32; a right vehicle body mounting section 36 and a right suspension support section 37 provided on a right end portion 32b of the subframe body 32; a middle connection section 38 provided on a front middle portion of the subframe body 32.

The left vehicle body mounting section 34 includes a left front mounting section 34a provided on a front portion 32c of the left end portion 32a of the subframe body 32, and a left rear mounting section 34b provided on a rear portion 32d of the left end portion 32a of the subframe body 32.

Similarly to the left vehicle body mounting section 34, the right vehicle body mounting section 36 includes a right front mounting section 36a provided on a front portion 32e of the right end portion 32b of the subframe body 32, and a right rear mounting section 36b provided on a rear portion 32f of the right end portion 32b of the subframe body 32.

The left front mounting section 34a and the left rear mounting section 34b are fastened to the left side frame 11 (FIG. 1) by means of bolts, and the right front mounting section 36a and the right rear mounting section 36b are fastened to the right side frame 12 (FIG. 1) by means of bolts. In this manner, the subframe 15 is secured to the left and right side frames 11 and 12.

Referring back to FIGS. 1 and 2, the left suspension support section 35 includes a left front connection section 81 provided on the front portion 32c of the left end portion 32a of the subframe body 32, and a left rear connection section 82 provided on the rear portion 32d of the left end portion 32a of the subframe body 32.

The left front connection section 81 is provided on the front portion 32c of the subframe body 32 to protrude from an outer peripheral portion 32g of the subframe body 32 forward or toward the front of the vehicle. The left front connection section 81 is located forward of the left front mounting section 34a.

The left rear connection section 82 is provided on the rear portion 32d of the subframe body 32 to protrude outward in a vehicle width direction (i.e., leftward) from the outer peripheral portion 32g of the subframe body 32. The left rear connection section 82 is provided more inward in the vehicle width direction than, or inward of, the left rear mounting section 34b (see FIG. 4), so that the left rear connection section 82 is disposed between the left rear mounting section 34b and the rear portion 32d.

A front mounting section 16a of the left suspension arm 16 is connected to the left front connection section 81 by means of a left front support pin 84, and a rear mounting section 16b of the left suspension arm 16 is connected to the left rear connection section 82 by means of a left rear support pin.

The left suspension 21 is connected at its lower end portion 21a to the left suspension arm 16 and connected at its upper end portion 2 1b to a left damper housing 13 formed integrally with the left side frame 11. Thus, the left suspension 21 is supported by the left suspension arm 16, so that it is supported by the left suspension section 35 via the left suspension arm 16.

Similarly to the left suspension arm 35, the right suspension support section 37 includes a right front connection section 87 provided on the front portion 32e of the right end portion 32b of the subframe body 32, and a right rear connection section 88 provided on the rear portion 32f of the right end portion 32b of the subframe body 32.

The right front connection section 87 is provided on the rear portion 32e of the subframe body 32 to protrude from the outer peripheral portion 32g forward or toward the front of the vehicle. The right front connection section 87 is located forward of the right front mounting section 36a.

The right front connection section 87 is provided on the rear portion 32f of the subframe body 32 to protrude outward in a vehicle width direction (i.e., rightward) from the outer peripheral portion 32g of the subframe body 32. The right rear connection section 88 is provided more inward in the vehicle width direction than, or inward of, the right rear mounting section 36b (see also FIG. 4), so that the right rear connection section 88 is disposed between the right rear mounting section 36b and the rear portion 32f.

A front mounting section 17a of the right suspension arm 17 is connected to the right front connection section 87 by means of a right front support pin 91, and a rear mounting section 17b of the right suspension arm 17 is connected to the right rear connection section 88 by means of a right rear support pin.

The right suspension arm 17 is substantially in left-right symmetry with the left suspension arm 16. The right suspension 22 is connected at its lower end portion 22a to the right suspension arm 17 and connected at its upper end portion 22b to a right damper housing 14 formed integrally with the right side frame 12. Thus, the right suspension 22 is supported by the right suspension arm 17, so that it is supported by the right suspension section 37 via the right suspension arm 17.

In the aforementioned manner, the left suspension 21 is connected to the left suspension support section 35 via the left suspension arm 16, and the right suspension 22 is connected to the right suspension support section 37 via the right suspension arm 17. Namely, a relatively large load is input to the left suspension support section 35 by way of the left suspension arm 16, and a relatively large load is input to the right suspension support section 37 by way of the right suspension arm 17. Therefore, it is preferable to secure a sufficient rigidity and strength of the left suspension support section 35 (more specifically, the left front connection section 81 and the left rear connection section 82) and the right suspension support section 37 (more specifically, the right front connection section 87 and the right rear connection section 88).

As shown in FIG. 4, the left front connection section 81 and the right front connection section 87 are provided to protrude forward from the front outer peripheral portion 32g of the subframe body 32.

In forming the subframe 15 by high-pressure casting, molten aluminum alloy is poured through a molten metal pouring flow path formed in a rear portion 15b of the subframe 15. Thus, the left front connection section 81 and the right front connection section 87 are located relatively remote from the molten metal pouring flow path.

Thus, left and right longitudinal protruding sections 66 and 67 and a transverse protruding section 65 are formed on the subframe 15 so that the molten metal can be smoothly directed to the left front connection section 81 and the right front connection section 87. Such left and right longitudinal protruding sections 66 and 67 and transverse protruding section 65 will be described in detail later with reference to FIGS. 4 to 7.

The left rear connection section 82 and the right rear connection section 88 are provided near the rear outer peripheral portion 32g of the subframe body 32. Thus, the left rear connection section 82 and the right rear connection section 88 are located relatively near the above-mentioned molten metal pouring flow path, so that the molten metal can be smoothly directed to the left rear connection section 82 and the right rear connection section 88.

By the molten metal being smoothly directed to the left and right front connection sections 81 and 87 and the left and right rear connection sections 82 and 88 as above, it is possible to secure a sufficient rigidity and strength of the left and right front connection sections 81 and 87 and the left and right rear connection sections 82 and 88; namely, it is possible to secure a sufficient rigidity and strength of the left and right suspension support sections 35 and 37.

Referring again back to FIGS. 1 and 2, the middle connection section 38 is provided on a middle front half region of the subframe body 32, more particularly, on a middle portion 32h, in the vehicle width direction, of the subframe body 32.

The torque rod 26 is connected at its proximal end portion 26a to the middle connection section 38 by means of a bolt 51 and a nut 52 and connected at its distal end portion 26b to the power plant 25 by means of a bolt 53. Thus, the power plant 25 is supported by the torque rod 26.

Figure 5:
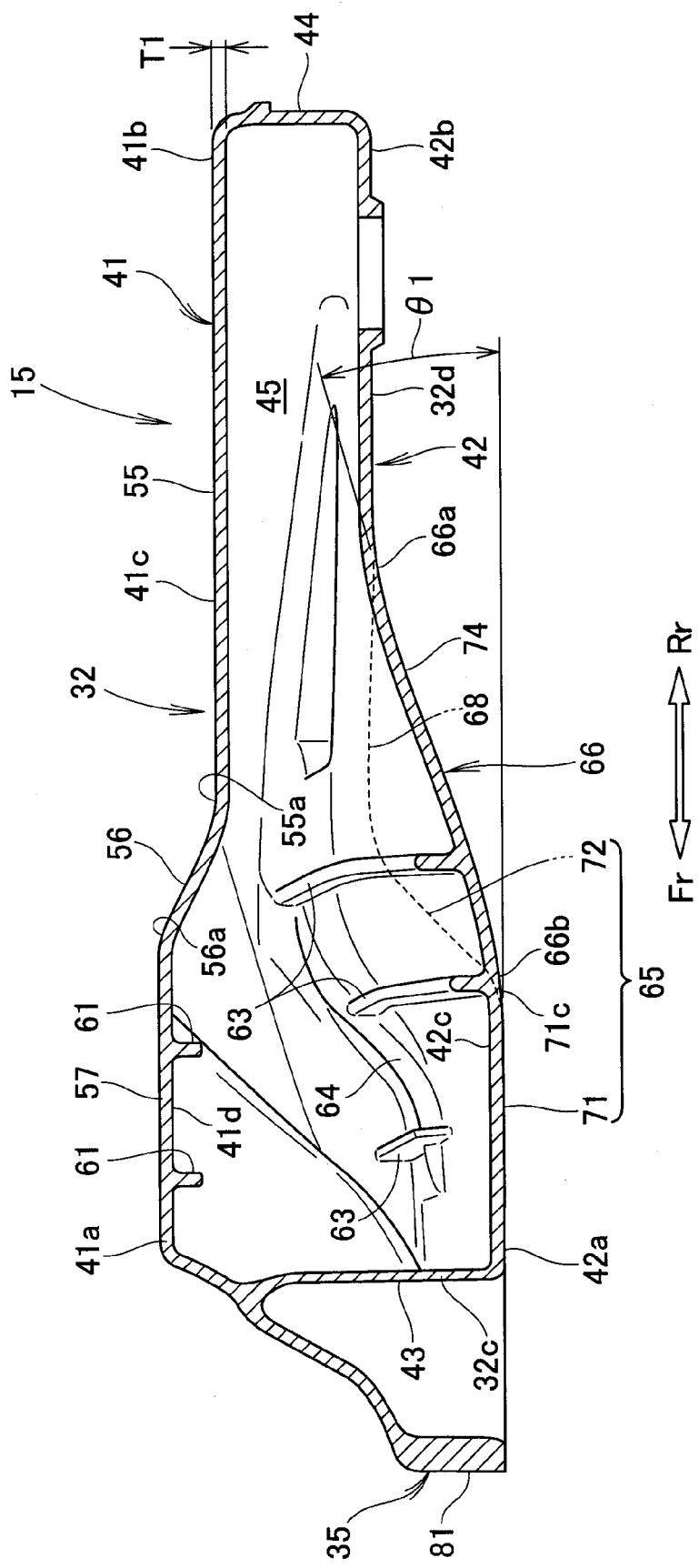
FIG. 5 is a sectional view taken along line 5-5 of FIG. 3.

Further, as shown in FIG. 5, the subframe body 32 includes: an upper section 41 facing upward; a lower section facing downward; a front wall 43 interconnecting respective front end portions 41a and 42a of the upper and lower portions 41 and 42; and a rear wall 44 interconnecting respective rear end portions 41b and 42b of the upper and lower portions 41 and 42. The subframe body 32 has a hollow portion 45 defined by the upper and lower sections 41 and 42 and the front and rear walls 43 and 44. The hollow portion 45 is formed by the core 92 (see FIG. 9) in a casting process of the subframe 15. Further, the upper and lower sections 41 and 42 are spaced from each other by a predetermined distance in a vertical or up-down direction.

In a region 41c immediately inward, in the vehicle width direction, of the left suspension support section 35 (the left front connection section 81 and the left rear connection section 82 (see FIG. 3)), the upper section 41 of the subframe body 32 includes an upper rear flat portion 55, an upper slant portion 56 and an upper front flat portion 57.

The upper rear flat portion 55 extends substantially horizontally forward from a rear end portion 41b to a middle portion, in the front-rear direction, of the upper section 41. The upper slant portion 56 extends forward in an upward slope from the front end 55a of the upper rear flat portion 55. Further, the upper front flat portion 57 extends forward substantially horizontally from the front end 56a of the upward slant portion 56 to the front end portion 41a of the upper section 41. Thus, the upper rear flat portion 55, the upward slant 56 and the front upper front flat portion 57 are formed in a gentle shape with no irregularities.

In this manner, the upper section 41 of the subframe body 32 is formed in a gentle shape n the inward region 41c from the rear end portion 41b to the front end portion 41a. Because the upper section 41 of the subframe body 32 is formed in a gentle shape from the rear end portion 41b to the front end portion 41a as above, the molten metal of aluminum alloy can be directed smoothly in the high-pressure casting process of the subframe 15.

Figure 6:
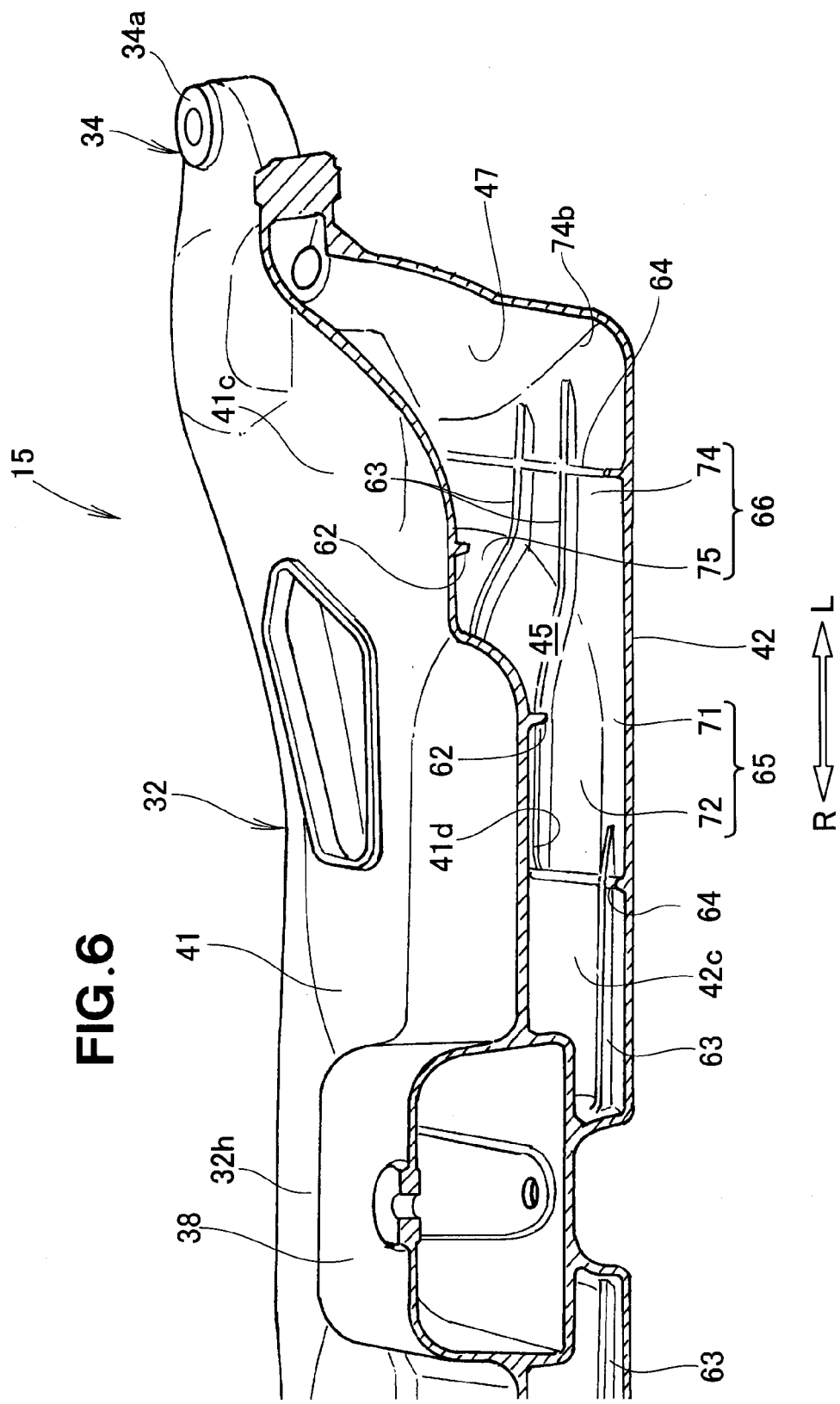
FIG. 6 is a sectional view taken along line 6-6 of FIG. 3.

As shown in FIGS. 5 and 6, a plurality of upper transverse ribs 61 and a plurality of upper longitudinal ribs 62 are provided on the inner surface 41d of the upper section 41 and projects into the hollow portion 45. The transverse ribs 61 extend in the vehicle width direction, while the upper longitudinal ribs 62 extend in the vehicle front-rear direction.

Here, the upper section 41 of the subframe body 32 is formed in a gentle shape from the rear end portion 41b to the front end portion 41a so as to smoothly direct the molten metal from the rear end portion 41b to the front end portion 41a.

Thus, the molten metal can be smoothly directed from the rear end portion 4 lb to the front end portion 41a of the upper section 41 even where the plurality of upper transverse ribs 61 and the plurality of upper longitudinal ribs 62 are not oriented in the same direction as (i.e., are not oriented to match) the flowing direction of the molten material.

Thus, molded directions (orientations) of the upper transverse ribs 61 and the upper longitudinal ribs 62 can be determined in such a manner as to secure a sufficient rigidity and strength of the upper section 41. Thus, the upper section 41 can be reinforced appropriately by the upper transverse ribs 61 and the upper longitudinal ribs 62.

Figure 7:
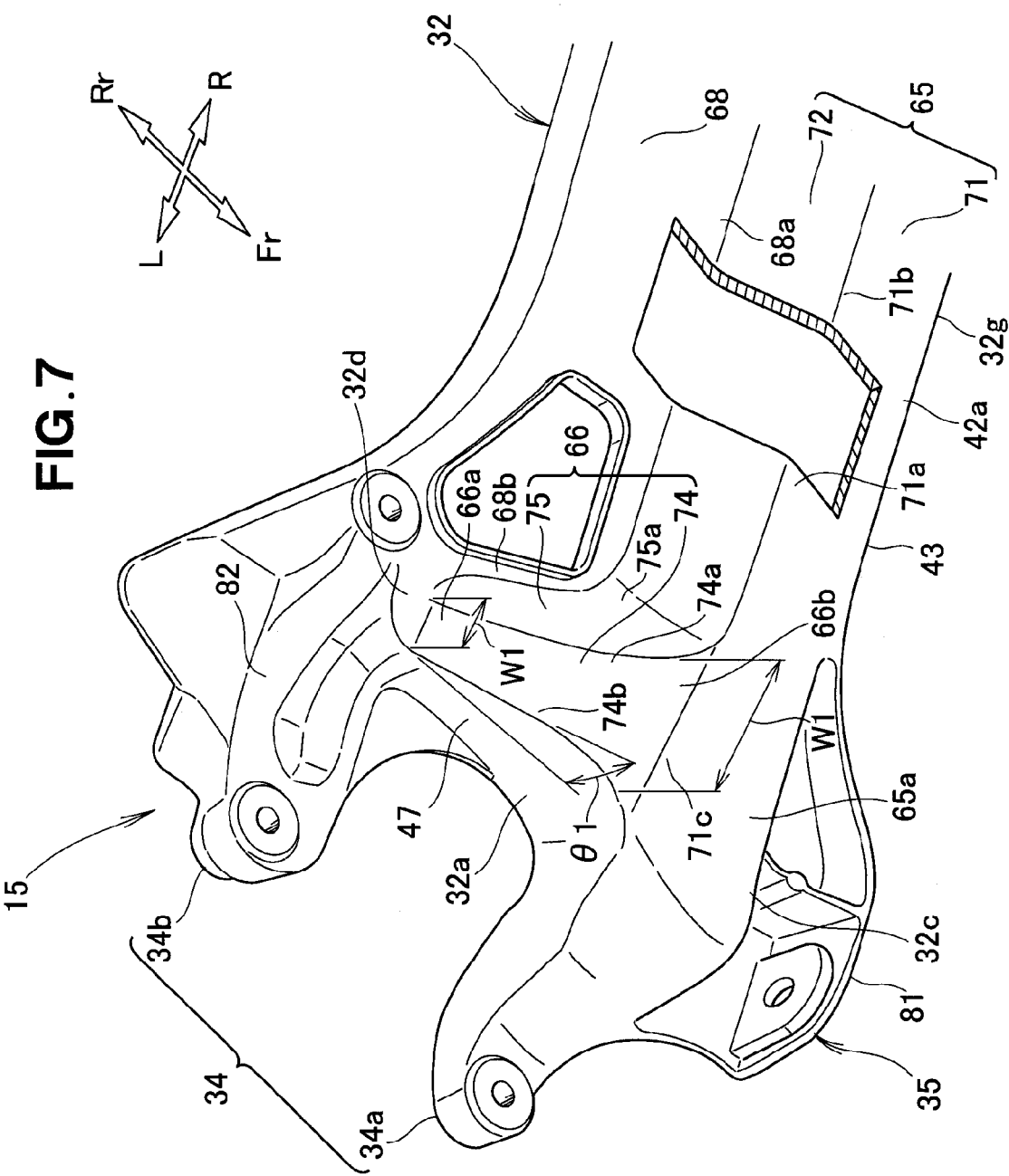
FIG. 7 is a rear lower perspective view of the subframe of FIG. 3.

Further, as shown in FIGS. 4 and 7, the lower section 42 of the subframe body 32 includes: a transverse protruding section 65 extending in the vehicle width direction along the front outer peripheral portion 32g of the subframe body 32; a left longitudinal protruding section 66 extending from a left end portion 65a of the transverse protruding section 65 along a left end portion 32a of the subframe body 32; a right longitudinal protruding section 67 extending from a right end portion 65b of the transverse protruding section 65 along a right end portion 32b of the subframe body 32; and a recessed section 68 surrounded by the transverse protruding section 65 and the left and right longitudinal protruding sections 66 and 67.

Because the left longitudinal protruding section 66 and the right longitudinal protruding section 67 are symmetric with each other in the left-right direction, like elements of the left and right longitudinal protruding sections 66 and 67 are depicted by same reference numerals, and the following mainly describe the left longitudinal protruding section with a detailed description about the right longitudinal protruding section 67 omitted to avoid unnecessary duplication.

The transverse protruding section 65 extends along the front outer peripheral portion 32g of the subframe body 32 toward the left front connection section 81 and the right front connection section 87. The transverse protruding section 65 includes a transverse bottom portion 71 extending along the front outer peripheral portion 32g of the subframe body 32, and a transverse wall portion 72 formed along the rear end edge 71a of the transverse bottom portion 71.

The transverse bottom portion 71 is a band-shaped flat portion that is located beneath the recessed section 68 and extends horizontally along the front outer peripheral portion 32g of the subframe body 32. The front wall 43 (see also FIG. 5) is formed integrally on the front end portion 42a of the transverse bottom portion 71 (i.e., the front end portion 42a of the lower section 42).

The transverse wall portion 72 extends obliquely upward and rearward from a rear middle portion 71b of the rear end edge 71a of the transverse bottom portion 71 to a front end portion 68a of the recessed section 68. The rear middle portion 71b is located between the left and right end portions 65a and 65b of the transverse protruding section 65. The transverse protruding section 65 protrudes downward relative to the recessed section 68 (see also FIG. 5).

The left front connection section 81 is provided integrally on the left end portion 32c of the front wall 43 (i.e., front portion of the left end portion 32a) (see also FIG. 5). The left front connection section 81 is located forward of the left end portion 65a of the transverse protruding section 65.

Further, the right front connection section 87 is provided integrally on the right end portion 32e of the front wall 43 (i.e., front portion of the right end portion 32b). The right front connection section 87 is located forward of the right end portion 65b of the transverse protruding section 65. Namely, the left front connection section 81 and the right front connection section 87 are connected to the transverse protruding section 65 via the front wall 43.

The left longitudinal protruding section 66 is provided along the left end portion 32a of the subframe body 32 between the left end portion 65a of the transverse protruding section 65 and the left rear connection section 82. The left longitudinal protruding section 66 is connected at its rear end portion 66a to a left rear end portion of the recessed section 68 (i.e., to the rear portion 32d of the subframe body 32) and connected at its front end portion 66b to the left end portion 65a of the transverse protruding section 65.

More specifically, the left longitudinal protruding section 66 includes a longitudinal bottom portion 74 extending along the left end portion 32a of the subframe body 32, and a longitudinal wall portion 75 extending along an inner end portion 74a of the longitudinal bottom portion 74.

Further, as shown in FIG. 5, the longitudinal bottom portion 74 extends in a downward slope of a slope angle θ1 (see also FIG. 7) from the rear end portion 66a to the front end portion 66b of the left longitudinal protruding section 66.

Further, as shown in FIGS. 4 and 7, the longitudinal bottom portion 74 is widened outwardly and inwardly in the vehicle width direction (i.e., in the left-right direction of the subframe body 32) from the rear end portion 66a to the front end portion 66b. Namely, the longitudinal bottom portion 74 is formed in a substantial fan shape with a width W1 gradually increasing in a direction from the rear end portion 66a to the front end portion 66b. A left wall 47 (see also FIG. 6) is formed integrally on an outer end portion 74b of the longitudinal bottom portion 74. The longitudinal wall portion 75 slants upwardly and inwardly from the inner end portion 74a of the longitudinal bottom portion 74 to a left end portion 68b of the recessed section 68. The longitudinal wall portion 75 is connected at its front end portion 75a to a left end portion of the transverse wall portion 72.

Namely, as shown in FIG. 5, the left longitudinal protruding section 66 gradually protrudes downward from the recessed section 68 from the rear end portion 66a toward the front end portion 66b.

With the front end portion 66b of the left longitudinal protruding section 66 connected to the left end portion 65a of the transverse protruding section 65 as above, the rear portion 32d of the subframe body 32 and the left front connection section 81 can be connected gently by the left longitudinal protruding section 66 and the transverse protruding section 65. In this way, the region from the rear portion 32d of the subframe body 32 to the left front connection section 81 can be formed in a shape with no irregularities, which can achieve an increased flowability of the molten metal.

Similarly, as shown in FIG. 4, a region from the rear portion 32f of the subframe body 32 to the right front connection section 87 can be formed in a shape with no irregularities, which can achieve an increased flowability of the molten metal.

Thus, when the subframe 15 shown in FIGS. 4 and 7 is molded by high-pressure casting, the molten metal can be smoothly directed to the left and right front connection sections 81 and 87 even through the left and right front connection sections 81 and 87 are located relatively remote from the molten metal pouring path.

Further, the longitudinal bottom portion 74 is widened outwardly and inwardly in the vehicle width direction from the rear end portion 66a toward the rear end portion 66b. Thus, when the subframe 15 is molded by high-pressure casting, the molten metal can be smoothly directed outwardly and inwardly in the vehicle width direction. Namely, the molten metal poured through the rear portion 15b of the subframe 15 can be smoothly directed to the left front connection section 81. Similarly, the molten metal poured through the rear portion 15b of the subframe 15 can be smoothly directed to the right front connection section 87.

Because the molten metal can be smoothly directed to the left front connection section 81 and the right front connection section 87 as above, the left front connection section 81and the right front connection section 87 can have a sufficient rigidity and strength, with the result that the subframe 15 can have a sufficient rigidity and strength. Consequently, there is no need to form the subframe 15 into a large thickness T1 (see FIG. 5), with the result that an undesired increase of the weight of the subframe 15 can be minimized Further, as shown in FIGS. 6 and 8, a plurality of lower transverse ribs 63, a plurality of lower longitudinal ribs 64 and a plurality of lower slanting ribs 69 are provided on the inner surface 42c of the lower section 42 and project into the hollow portion 45. The lower transverse ribs 63 extend in the vehicle width direction, while the lower longitudinal ribs 64 extend in the vehicle front-rear direction. Further, the lower slanting ribs 69 are provided on the subframe body 32 rearwardly of the middle connection section 38 and slants outwardly in the vehicle width direction.

Here, the lower section 42 is formed in a gentle shape from a rear end portion 42b to the front end portion 42a so that the molten metal can be smoothly directed from the rear end portion 42b to the front end portion 42a.

Thus, even where the plurality of lower transverse ribs 63, the plurality of lower longitudinal ribs 64 and the plurality of lower slanting ribs 69 are not oriented so as to match the molten metal flowing direction, the molten metal can be smoothly directed from the rear end portion 42b to the front end portion 42a of the lower section 42. Thus, molded directions (orientations) of the lower transverse ribs 63, lower longitudinal ribs 64 and lower slanting ribs 69 can be determined in such a manner as to secure a sufficient rigidity and strength of the lower section 42. Consequently, the lower section 42 can be appropriately reinforced with the lower transverse and longitudinal ribs 63 and 64 and the lower slanting rib 69.

With the lower section 42 appropriately reinforced with the lower transverse and longitudinal ribs 63 and 64 and the lower slanting rib 69 and with the upper section 41 reinforced with the plurality of upper transverse ribs 61 and the plurality of upper longitudinal ribs 62 as above, it is possible to even further increase the rigidity and strength of the sub frame 15. As a result, it is possible to appropriately minimize an increase of the thickness T1 (see FIG. 5) of the subframe 15 and thus even more appropriately minimize an undesired increase of the weight of the subframe 15.

Further, with the left longitudinal protruding section 66 widened outwardly and inwardly in the vehicle width direction from the rear end portion 66a toward the front end portion 66b, the front end portion 66b of the left longitudinal protruding section 66 can be formed into a relatively large size (see also FIG. 7). Because the front end portion 66b of the left longitudinal protruding section 66 has a large size like this, the left front connection section 81 can be provided directly on the front end portion 66b. Thus, there is no need to form, on the front end portion 66b of the left longitudinal protruding section 66, a particular part for providing thereon the left front connection section 81, so that the subframe 15 can be simplified in construction.

As shown in FIG. 4, the right longitudinal protruding section 67 is in left-right symmetry with the above-described left longitudinal protruding section 66, and it is provided along the right end portion 32b of the subframe body 32 between the right end portion 65b of the transverse protruding section 65 and the right rear connection section 88. Namely, the transverse protruding section 65 is provided along the outer peripheral portion 32g of the subframe body 32, the left longitudinal protruding section 66 is provided along the left end portion 32a of the subframe body 32, and the right longitudinal protruding section 67 is provided along the right end portion 32b of the subframe body 32. As viewed in bottom plan, the subframe body 32 is formed in a substantial C shape by the transverse protruding section 65 and the left and right longitudinal protruding sections 66 and 67.

The recessed section 68 is surrounded by the transverse protruding section 65 and the left and right longitudinal protruding sections 66 and 67. The recessed section 68 is formed in a substantial rectangular shape by the front end portion 68a, the left and right end portions 68b and 68c and the rear end portion 68d. The recessed section 68 protrudes upwardly relative to the transverse protruding section 65, left longitudinal protruding section 66 (see also FIG. 6) and right longitudinal protruding section 67. Namely, the recessed section 68 protrudes toward the hollow portion 45 (see FIG. 6).

The following describe, with reference to FIGS. 4, 5, 7 and 9 to 12, an example manner in which the subframe 15 is molded by high-pressure casting.

As shown in FIG. 9, the core 92 (depicted in imaginary line) is positioned with a casting mold 91 opened, and then, the casting mold 91 is clamped. By the clamping of the casting mold 91, a cavity 93 is formed by the casting mold 91 and the core 92. The cavity 93 is in communication with a plurality of flow paths (only one of the flow paths 101 is shown). With the cavity 91 clamped, the molten metal of aluminum alloy is directed to the plurality of flow paths.

The following describe the flow path 101 of the plurality of flow paths which communicates with a left end portion of the cavity 93. The molten metal directed to the flow path 101 is then directed to the left end portion of the cavity 93 as indicated by arrow A. Then, a portion of the molten metal directed to the cavity 93 is directed to an upper cavity 94 as depicted by arrow B in FIG. 10.

Further, in the instant embodiment, as shown in FIG. 5, the upper section 41 of the subframe body 32 is formed in a gentle shape by the upper rear flat portion 55, the upper slant portion 56 and the upper front flat portion 57. Thus, as shown in FIG. 10, the upper cavity 94 is formed in a gentle shape, i.e. a shape with no irregularities, from a rear end portion 94a to a front end portion 94b, so that the flowability of the molten metal can be enhanced.

Thus, the molten metal directed to the upper cavity 94 can be smoothly directed along the upper cavity 94 as indicated by arrow C, so that the molten metal can be appropriately filled via the upper cavity 94 into a connection cavity 95 and a front wall cavity 96 as indicated by arrow D.

By the molten metal being appropriately filled into the connection cavity 95 and the front wall cavity 96 as above, it is possible to secure a sufficient rigidity and strength of the left front connection section 81 and the front wall 43 (particularly, left end portion of the front wall 43). The left end portion of the front wall 43 is formed by the front portion 32c of the left end portion 32a of the subframe body 32.

Figure 10:
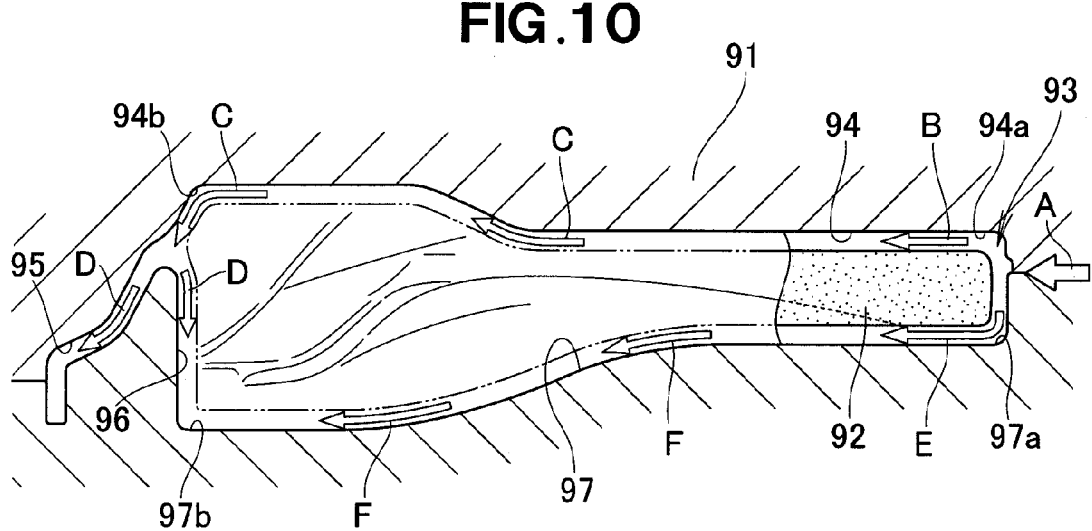
FIG. 10 is a view explanatory of an example manner in which the molten metal directed to the cavity is directed toward the front of the vehicle via upper and lower cavities.

The remaining portion of the molten metal directed to the cavity 93 is directed to a lower longitudinal cavity 97 as depicted by arrow E in FIG. 10.

Further, in the instant embodiment, as shown in FIG. 5, the lower section 42 of the subframe body 32 is formed in a gentle shape by the left longitudinal protruding section 66 and the left end portion 65a of the transverse protruding section 65 (see FIG. 7) from the rear end portion 42b to the front end portion 42a. The left front connection section 81 is provided adjacent to and forward of the front end portion 42a. Namely, the lower section 42 of the subframe body 32 is formed in a gentle shape from the rear end portion 42b to the left front connection section 81.

Thus, as shown in FIG. 10, the lower longitudinal cavity 97 is formed in a gentle shape, i.e. a shape with no irregularities, from a rear end portion 97a to a front end portion 97b, so that the flowability of the molten metal flowing along the lower longitudinal cavity 97 toward the front of the vehicle can be enhanced.

Figure 11:
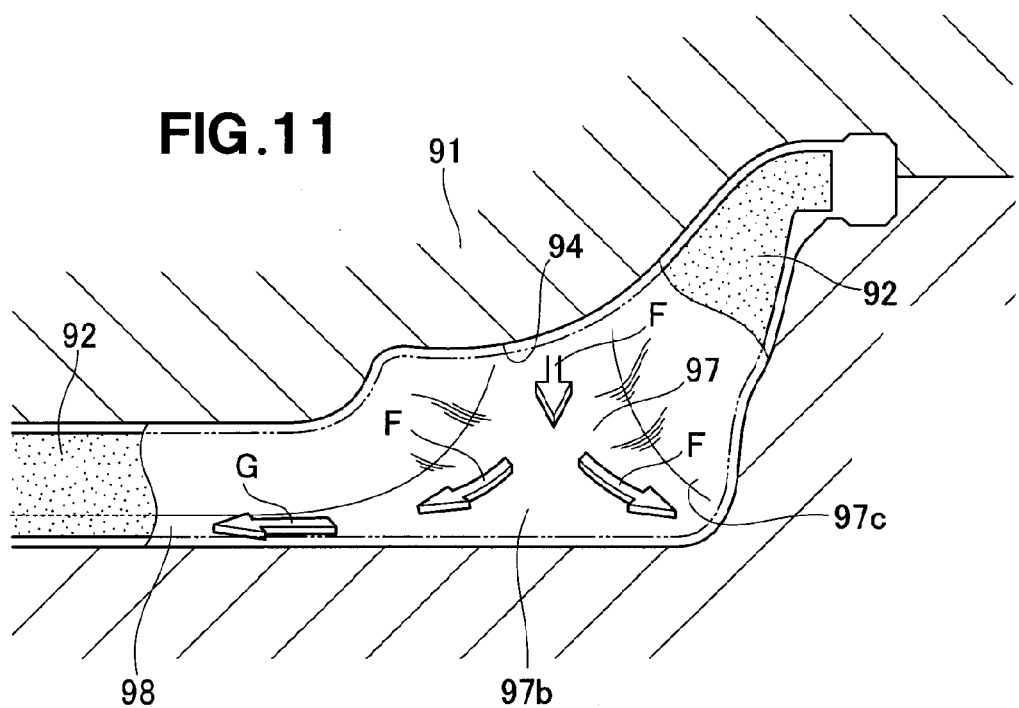
FIG. 11 is a view explanatory of an example manner in which the molten metal directed via the upper and lower cavities is directed to a left front connection section.

By virtue of the enhanced flowability along the lower longitudinal cavity 97, the molten metal directed to the rear end portion 97a of the lower longitudinal cavity 97 can be smoothly directed along the lower longitudinal cavity 97 to the front end portion 97b as indicated by arrow F (see also FIG. 11).

Further, as shown in FIG. 11, the front end portion 97b of the lower longitudinal cavity 97 is gently connected to a lower transverse cavity 98 that corresponds to the transverse protruding section 65 (see FIG. 7). Thus, the molten metal directed to the front end portion 97b of the lower longitudinal cavity 97 can be smoothly directed along the lower transverse cavity 98 as indicated by arrow G.

In addition, the longitudinal bottom portion 74 of the left longitudinal protruding section 66 is widened outwardly and inwardly in the vehicle width direction from the rear end portion 66a to the rear end portion 66b. Thus, the lower longitudinal cavity 97 is widened outwardly in the vehicle width direction from the rear end portion 97a (see FIG. 10) to the front end portion 97b.

Further, as shown in FIG. 9, the flow path 101 communicating with a left end portion of the cavity 93 extends radially to the cavity 93. Thus, the lower longitudinal cavity 97 has an outer wall 97c (see also FIG. 11) formed on and along an extension of the left path 101. Therefore, the molten metal directed to the left flow path 101 can be even more smoothly directed, via the lower longitudinal cavity 97 shown in FIG. 11, outwardly and inwardly in the vehicle width direction to the front end portion 97b as indicated by arrows F (particularly, by outward arrow F).

Thus, when the subframe 15 shown in FIG. 4 is to be molded by high-pressure casting, the molten metal poured through the rear portion 15b of the subframe 15 can be smoothly directed to the left front connection section 81.

By the molten metal being smoothly directed to the left front connection section 81 as above, it is possible to secure a sufficient rigidity and strength of the left front connection section 81. Consequently, there is no need to form the subframe 15 into a large thickness T1 (see FIG. 5), with the result that an undesired increase of the weight of the subframe 15 can be minimized The front end portion 97b of the lower longitudinal cavity 97 shown in FIG. 11 is a portion corresponding to the left front connection section 81 (see FIG. 5) of the subframe 15. Thus, by the molten metal being smoothly directed to the front end portion 97b of the lower longitudinal cavity 97, it is possible to secure a sufficient rigidity and strength of the left front connection section 81 and a sufficient rigidity and strength of the subframe 15.

By forming the lower section 42 shown in FIG. 5 in a gentle shape to thereby secure a sufficient rigidity and strength of the left front connection section 81 (subframe 15) as above, it is possible to eliminate the need for increasing the thickness T1 of the subframe 15 with a view to securing a sufficient rigidity and strength of the subframe 15. In this way, the thickness T1 of the subframe 15 can be appropriately limited, and thus, an increase of the weight of the subframe 15 can be minimized.

Figure 12:
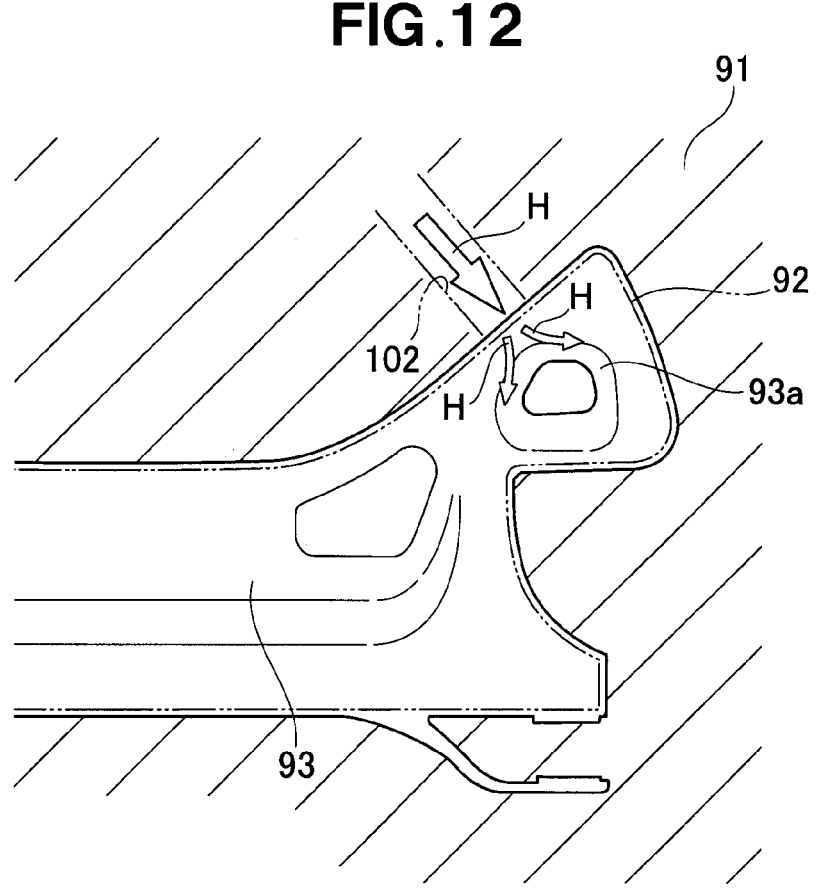
FIG. 12 is a view explanatory of an example manner in which the molten metal poured into a pouring port is directed to a left rear connection section.

Further, as shown in FIGS. 4 and 12, a cavity 93a corresponding to the left rear connection section 82 is located relatively near a left flow path 102. Thus, the molten metal can be smoothly directed to the cavity 93a via the left flow path 102 as indicated by arrow H, so that a sufficient rigidity and strength of the left rear connection section 82 can be secured.

Thus, when the subframe 15 is molded by high-pressure casting, a sufficient rigidity and strength of the left front connection section 81 and the left rear connection section 82 can be secured. In this way, a relatively large load input via the left suspension arm 16 to the left front connection section 81 and the left rear connection section 82 can be borne appropriately by the left front connection section 81 and the left rear connection section 82, and thus, an increased reliability of the subframe 15 can be achieved.

It should be appreciated that the vehicle subframe of the present invention is not limited to the above-described embodiment and may be modified as appropriate.

For example, whereas the embodiment of the present invention has been described above in relation to the case where the subframe 15 is formed of an aluminum alloy, the present invention is not so limited, and the subframe 15 of the present invention may be formed of any other suitable metal than aluminum alloy.

Further, whereas the embodiment of the present invention has been described above in relation to the case where the subframe 15 is formed of aluminum alloy by high-pressure casting, the present invention is not so limited, and the subframe 15 of the present invention may be formed by any other suitable type of casting.

Furthermore, whereas the embodiment of the present invention has been described above in relation to the case where the left and right longitudinal protruding sections 66 and 67 are widened outwardly and inwardly in the vehicle width direction from the rear end portion 66a toward the front end portion 66b, the present invention is not so limited. For example, the left and right longitudinal protruding sections 66 and 67 may be widened only outwardly in the vehicle width direction from the rear end portion 66a toward the front end portion 66b. Even in the case where the left and right longitudinal protruding sections 66 and 67 are widened only outwardly in the vehicle width direction, the same advantageous benefits as in the above-described embodiment can be achieved.

The shapes and constructions of the subframe, left and right suspension arms, left and right suspensions, body section, left and right suspension support sections, upper section, lower section, transverse protruding section, left longitudinal protruding section, right longitudinal protruding section, recessed section, left and right front connection sections, left and right rear connection sections, core, etc. are not limited to those illustratively shown and described in relation to the embodiment and may be modified as appropriate.

INDUSTRIAL APPLICABILITY

The basic principles of the present invention are well suited for application to automobiles equipped with a subframe which is provided under a vehicle body and in which left and right suspensions are supported by left and right suspension arms connected to a subframe body.

LIST OF REFERENCE SIGNS

10 . . . front vehicle body structure, 15 . . . subframe (vehicle subframe), 16, 17 . . . left and right suspension arms, 21, 22 . . . left and right suspensions, 32 . . . subframe body, 32a . . . left end portion of the subframe body, 32b . . . right end portion of the subframe body, 32c . . . front portion of the left end portion of the subframe body (front portion of the subframe body), 32d . . . rear portion of the left end portion of the subframe body (rear portion of the subframe body), 32e . . . front portion of the right end portion of the subframe body (front portion of the subframe body), 32f . . . rear portion of the right end portion of the subframe body (rear portion of the subframe body), 32g . . . outer peripheral portion, 35, 37 . . . left and right suspension support sections, 41 . . . upper section, 42 . . . lower section, 65 . . . transverse protruding section, 66 . . . left longitudinal protruding section, 66a . . . rear end portion of the left longitudinal protruding section, 66b . . . front end portion of the left longitudinal protruding section, 67 . . . right longitudinal protruding section, 68 . . . recessed section, 81 . . . left front connection, 82 . . . right front connection, 87 . . . right front connection, 88 . . . right rear connection, 92 . . . core

The invention claimed is:

1. A vehicle subframe integrally formed by casting using a core, comprising:
   a subframe body formed in a hollow shape by use of the core and including an upper section and a lower section spaced from each other in an up-down direction of the subframe by a predetermined distance; and
   left and right suspension support sections provided on left and right end portions, respectively, of the subframe body, the left and right suspension support sections respectively having left and right suspension arms connected thereto for supporting left and right suspensions,
   the left and right suspension support sections including left and right front connection sections, respectively, provided on front portions of an outer peripheral portion of the subframe body, and left and right rear connection sections provided on a rear outer peripheral portion of the subframe body,
   the lower section of the subframe body including:
      a transverse protruding section interconnecting the left and right front connection sections and protruding downwardly;
      longitudinal protruding sections connected at respective front end portions thereof to the transverse protruding section, each of the longitudinal protruding sections slanting downward from a rear portion of the subframe body toward the front end portion; and
      a recessed section surrounded by the longitudinal protruding sections and the transverse protruding section, the recessed section being formed in an upwardly concave shape.

2. The vehicle subframe according to claim 1, wherein each of the longitudinal protruding sections is widened outwardly in a left-right direction of the subframe body from a rear end portion thereof, located adjacent to the rear portion of the subframe body, toward the front end portion of the longitudinal protruding section.

* * * * *